US006809895B1

(12) United States Patent
Choi

(10) Patent No.: US 6,809,895 B1
(45) Date of Patent: Oct. 26, 2004

(54) HARD DISK DRIVE HAVING A PLURALITY OF HEAD DISK ASSEMBLIES

(75) Inventor: Soo-il Choi, Kumi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 465 days.

(21) Appl. No.: 09/232,138

(22) Filed: Jan. 15, 1999

(30) Foreign Application Priority Data

Jan. 15, 1998 (KR) ............................................ 98-1033

(51) Int. Cl.⁷ ............................................. G11B 5/012
(52) U.S. Cl. ....................... 360/61; 360/97.01; 711/112
(58) Field of Search ................. 360/61, 97.01, 360/98.01; 711/4, 111, 112, 114

(56) References Cited

U.S. PATENT DOCUMENTS

| 5,206,772 A | | 4/1993 | Hirano et al. ............. 360/98.01 |
| 5,218,689 A | | 6/1993 | Hotle .......................... 711/114 |
| H1221 H | * | 8/1993 | Best et al. ................ 360/97.01 |
| 5,264,975 A | * | 11/1993 | Bajorek et al. .......... 360/97.01 |
| 5,274,516 A | | 12/1993 | Kakuta et al. ................. 360/92 |
| 5,327,308 A | | 7/1994 | Hanson .................... 360/97.01 |
| 5,422,767 A | * | 6/1995 | Hatchett et al. .......... 360/98.01 |
| 5,517,373 A | | 5/1996 | Hanson .................... 360/98.01 |
| 5,673,412 A | * | 9/1997 | Kamo et al. ................. 711/114 |
| 5,841,997 A | | 11/1998 | Bleiweiss et al. ........... 710/131 |
| 5,913,926 A | * | 6/1999 | Anderson et al. .............. 714/6 |

* cited by examiner

Primary Examiner—David Ometz
(74) Attorney, Agent, or Firm—Robert E. Bushnell, Esq.

(57) ABSTRACT

A hard disk drive (HDD) for detecting and reading a signal written on a hard disk using a head. The hard disk drive includes: a plurality of head disk assemblies each having at least one controller, a plurality of disks for storing magnetized data and a plurality of heads for writing and reading data to and from the disks; a main printed circuit board physically being separated from each head disk assembly, for controlling reading/writing of data by the heads; and connectors for electrically connecting the main printed circuit board with each head disk assembly, wherein the main printed circuit board includes a setting unit for setting information about the disks and heads contained in each head disk assembly, and a switch unit for selecting a disk and a head of one head disk assembly according to the information set by the setting unit and assessing the selected disk and head via the corresponding connector when intended to access a predetermined disk and head of one of the head disk assemblies. The hard disk drive can do reading/writing operation by connecting a plurality of HDAs to one main PCB, so that disk storage capacity can be varied.

31 Claims, 3 Drawing Sheets

FIG. 1 *(Related Art)*
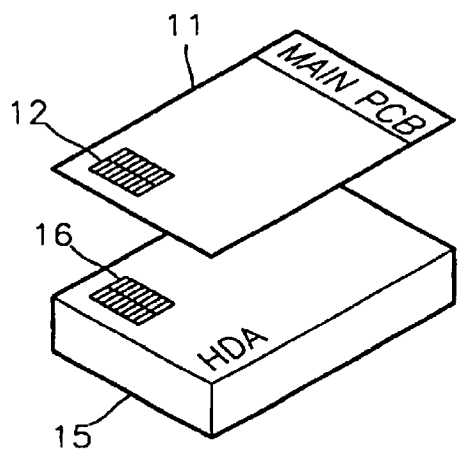
FIG. 2 *(Related Art)*
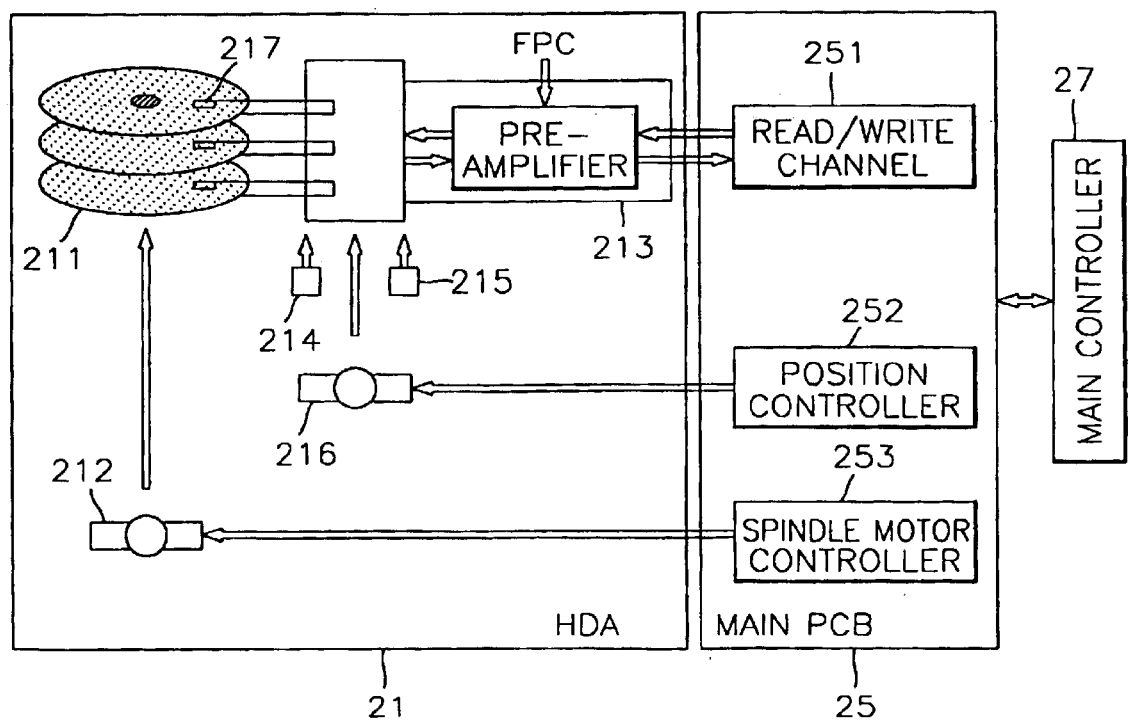

HARD DISK DRIVE HAVING A PLURALITY OF HEAD DISK ASSEMBLIES

CLAIM OF PRIORITY

This application makes reference to, incorporates the same herein, and claims all benefits accruing under 35 U.S.C. §119 from an application for Hard Disk Drive Having a Plurality of Head Disk Assemblies earlier filed in the Korean Industrial Property Office on 15 Jan. 1998 and there duly assigned Serial No. 1033/1998.

1. Field of the Invention

The present invention relates to a hard disk drive (HDD) for detecting a signal written on a hard disk using a head and reproducing the signal, and more particularly, to an HDD for integrally controlling a plurality of hard disks as one hardware structure.

2. Description of the Related Art

An HDD has been widely used as an auxiliary memory device to write information on a magnetic recording medium and to read the information therefrom. The HDD including an electronic device and a mechanical device can read and write data by converting a digital electronic pulse, which varies momentarily, into a permanent magnetic field. Information is written while a head acting as an electromagnet reacts with a platter (or disk) having a magnetizing property. On the contrary, when reading the information, the magnetized information is converted into an electrical signal.

In general, an HDD includes disks as magnetic recording media, magnetic heads for reading/writing data while traveling recording surfaces of the magnetic recording media, and a driving arm for driving the magnetic heads in its housing. Signals detected by the magnetic heads are transferred outward through a flexible printed cable (FPC) connected to the magnetic heads.

The concept of having a plurality of head disk assemblies accessed by one controller, wherein each head disk assembly contains a plurality of disks, can be seen in Hirano et al, U.S. Pat. No. 5,206,772 entitled Magnetic Disk Apparatus Having Improved Arrangement of Head Disk Assemblies. The concept is also shown in Hanson, U.S. Pat. No. 5,327,308 for a Disk Drive System With Transportable Carrier and Mounting System and in Hanson, U.S. Pat. No. 5,517,373 for a Disk Drive System With Plural Removable Carrier-Disk Drive Modules. What is not mentioned by these references is the fact that each one of a plurality of HDA's contains one or more controllers for performing such tasks as reading and writing data from or to a disk, controlling the movement of the heads, and controlling the rotation of the disks.

SUMMARY OF THE INVENTION

To solve the above problems, it is an object of the present invention to provide a hard disk drive (HDD) having a plurality of head disk assemblies, which can satisfy a need for variable disk storage capacities.

It is still yet another object of the present invention to have each one of a plurality of HDA's each contain one or more controllers within each HDA used for controlling the reading and writing from and to a disk, controlling the movement of the heads, and controlling the rotation of the disks.

It is still yet another object of the present invention to have each one of a plurality of HDA's each contain one or more controllers within each HDA used for controlling the reading and writing from and to a disk, controlling the movement of the heads, and controlling the rotation of the disks.

To achieve these objectives, there is provided an HDD for detecting and reading a signal written on a hard disk using a head, comprising: a plurality of head disk assemblies each having a plurality of disks for storing magnetized data and a plurality of heads for writing and reading data to and from the disks; a main printed circuit board physically being separated from each head disk assembly, for controlling reading/writing of data by the heads of the head disk assemblies; and connectors for electrically connecting the main printed circuit board with each head disk assembly.

Preferably, the main printed circuit board comprises a setting unit for setting information about the disks and heads contained in each head disk assembly, and a switch unit for selecting a disk and a head of one head disk assembly according to the information set by the setting unit and assessing the selected disk and head via the corresponding connector when intended to access a predetermined disk and head of one of the head disk assemblies.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a diagram illustrating the structure of an earlier hard disk drive (HDD);

FIG. 2 is a block diagram showing the structure of a general HDD;

DETAILED DESCRIPTION OF THE INVENTION

Figure 3:
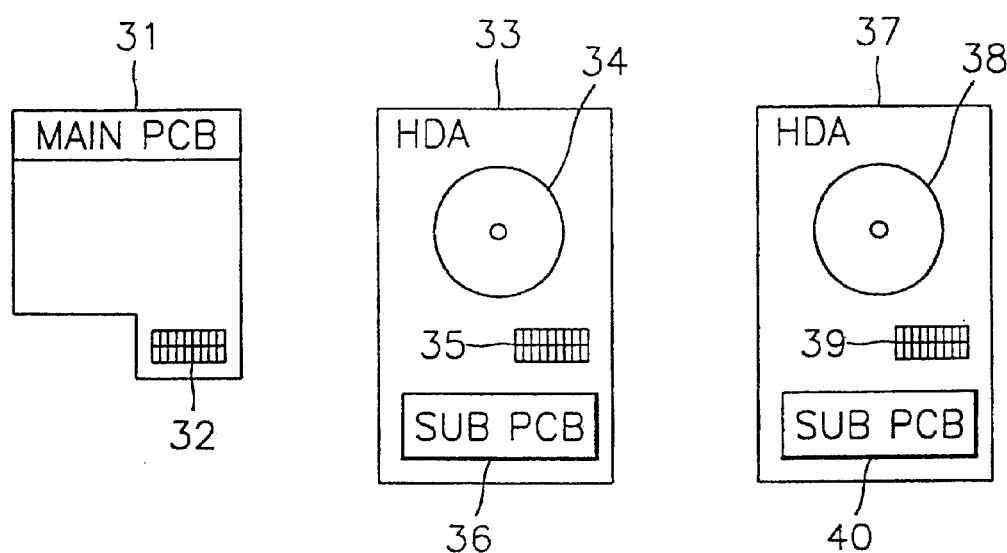
FIG. 3 is a diagram illustrating the structure of an HDD according to the present invention.

FIG. 1 is a diagram illustrating the structure of an earlier HDD. The HDD is physically and roughly divided into a main printed circuit board (PCB) 11 and a head disk assembly (HDA) 15. Also, the HDD includes connectors 12 and 16 for electrically connecting the PCB 11 and the HDA 15.

The HDA 15 includes disks for storing magnetized data and heads for writing and reading data to and from the disks, to read/write data from/to an appropriate position of the disks. Also, the main PCB 11 controls the reading/writing of data by the heads, position of the heads on the disks and the speed of a spindle motor.

As shown in FIG. 1, the earlier hard disk drive includes only one main PCB 11 and one HDA 15, so that only one HDA can be driven within the structure. Thus, because the earlier drive has a fixed disk storage capacity, a need for various disk storage capacities cannot be satisfied.

Referring to FIG. 2, a general HDD is roughly divided into a head disk assembly (HDA) 21 and a main printed circuit board (PCB) 25, and is controlled by a main controller 27 such as a personal computer.

The HDA 21 includes a plurality of disks 211 for storing magnetized data, a plurality of heads 217 for writing data from a read/write channel onto the disks 211 and reading the data from the disks 211, a pre-amplifier 213 for amplifying a signal detected by the heads 217, a spindle motor 212 for rotating the disks 211 at a constant speed, a voice coil motor (VCM, not shown) for moving an actuator 216 into a predetermined position of each disk, and a crash stop 214 for buffering the impact of the actuator 216 when the head 217 moves to a parking zone or slides out of a data zone during a search. Here, all the above elements of the HDA 21 are assembled within a closed metal box.

The main PCB 25 includes a read/write channel 251 for modulating an analog signal read by the head 217 into a digital signal readable by a host and receiving user data from the host to write the data on the disks 211 via the pre-amplifier 213, a position controller 252 for performing calculation and control required to move the actuator 216 into a predetermined position of the disk, and a spindle motor controller 253 for controlling the spindle motor 212 to a constant rotation speed.

When the HDD is turned on, the spindle motor controller 253 drives the spindle motor 212 to rotate the disk 211 at a constant speed, so that the head parked in the inner position of the disk rises to a predetermined height, being ready to reach an intended position. Write operation starts when the head 217 reaches the intended track and sector according to a search command output by the main controller 27. The data transmitted from the main controller 27 is encoded and then transmitted to the read/write channel 251. The read/write channel 251 converts the transmitted signal into a write current to flow through a coil, and then the current generates a magnetic field to write the data to the disk 211.

When the current is applied to the head 217 via the pre-amplifier 213, current flows along the head coil, so that a magnetic field is induced and the induced magnetic field magnetizes the disk 211. That is, the writing onto the hard disk is to magnetize the disk with the induced magnetic field. Also, if the direction of the current flowing through the coil is reversed, the direction of the magnetic field is reversed, so that the magnetization direction of a medium is also changed. The reading operation is performed in the reversed sequence of the writing operation. When the head goes over the disk which has magnetized with N and S poles, the head is affected by the magnetic field of the disk. The magnetic field is constant in the magnetized region, so that voltage is not induced in the region. However, when the head passes by the boundary where the direction of the magnetic field changes, current is induced due to the reversion in direction of the magnetic field. Thus, the data can be read using the induced current.

FIG. 3 is a diagram illustrating the structure of the HDD according to the present invention. Here, reference numeral 31 represents a main PCB, reference numeral 33 represents a first HDA, and reference numeral 37 represents a second HDA.

In the present invention, a plurality of HDAs are controlled by one main PCB, thereby providing various disk storage capacities. The main PCB 31 includes a circuit for controlling the plurality of HDAs. The first and second HDAs 33 and 37 have sub PCBs 36 and 40, respectively, separated from the main PCB 31, each of which contains circuits required for driving the hard disk or reading/writing data. For example, a driving circuit for the spindle motor may be included in the sub PCBs 36 and 40. Also, there are connectors 32, 35 and 39 for connection between the main PCB and the sub PCBs 36 and 40 of the HDAs 33 and 37.

Figure 4:
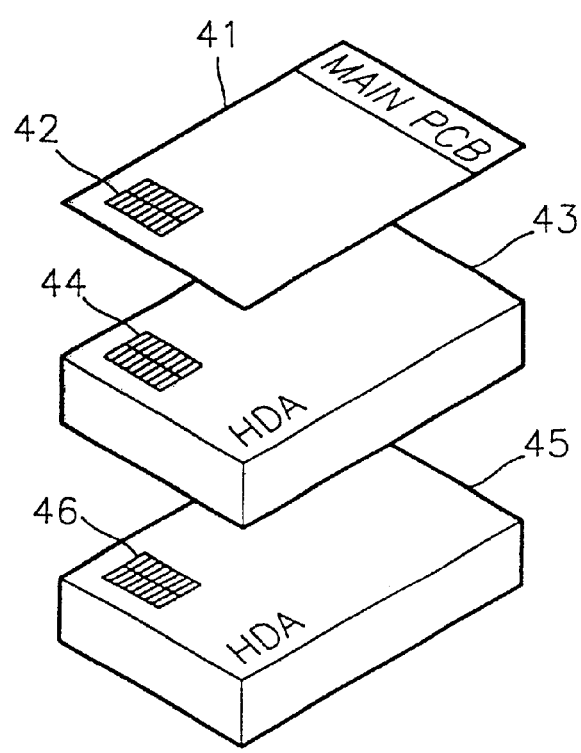
FIG. 4 is a diagram illustrating the external structure of the HDD shown in FIG. 3.

FIG. 4 is a diagram showing the external structure of the HDD shown in FIG. 3. The main PCB 41, and each HDA 43 and 45 is constituted as separate hardware, and connected to each other via the connectors 42, 44 and 46.

Figure 5:
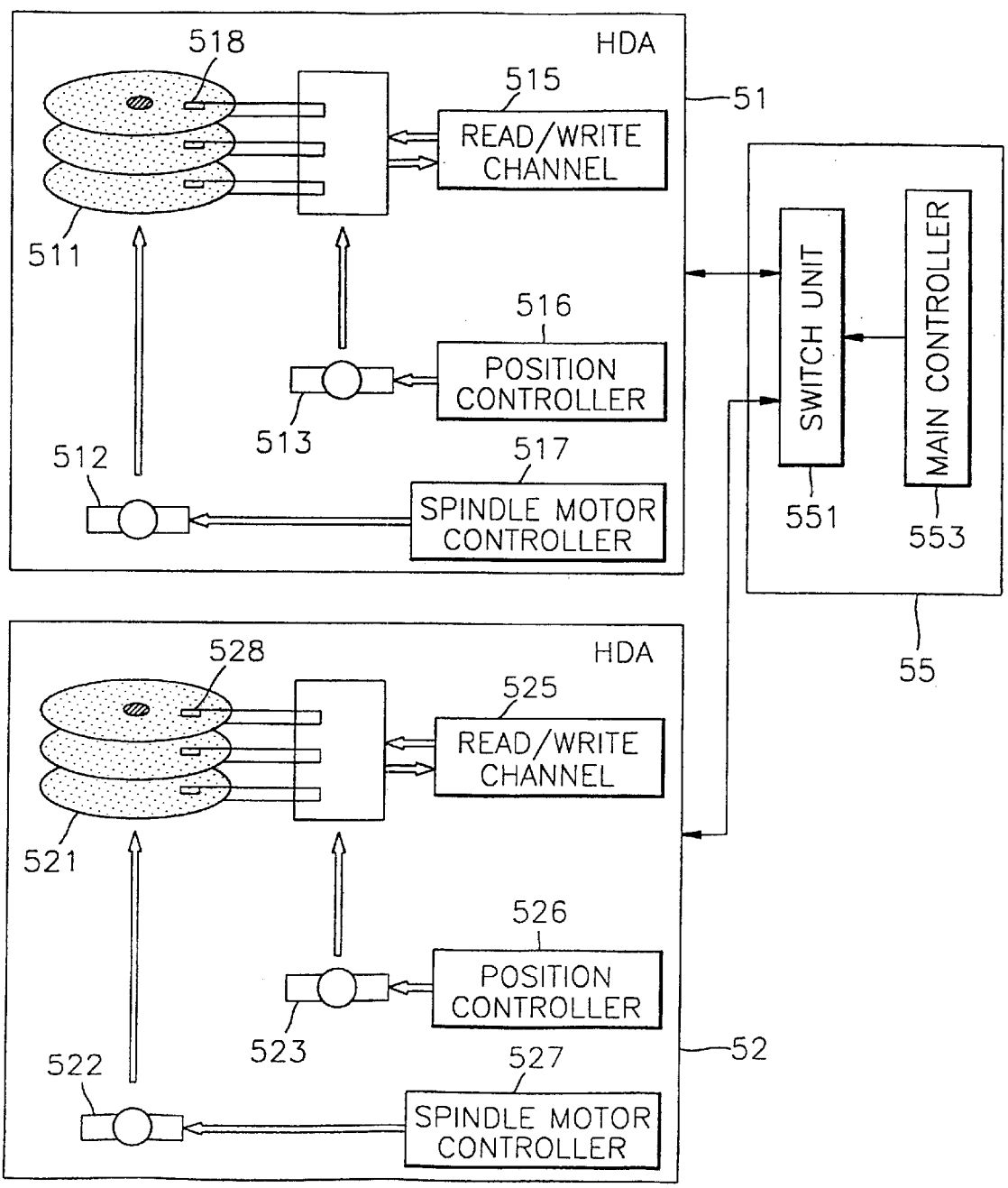
FIG. 5 is a detailed block diagram of the HDD of FIG. 3 according to the present invention.

FIG. 5 is a detailed block diagram of the HDD according to the present invention. Here, two HDAs 51 and 52 are connected to one main PCB 55.

The first HDA 51 includes disks 511 for storing magnetized data, heads 518 for writing data onto the disks 511 and reading the data from the disks 511, a read/write channel 515 for modulating an analog signal read by the heads 518 into a digital signal and receiving user data to write the data to the disks 511, a position controller 516 for controlling an actuator 513 to move the head 518 into a predetermined position of the disk 511, and a spindle motor controller 517 for controlling a spindle motor 512 to a constant rotation speed. The first HDA 51 may also contain a controller for reading and writing data from or to a disk.

Also, the second HDA 52 includes disks 521 for storing magnetized data, heads 528 for writing data onto the disks 521 and reading the data from the disks 521, a read/write channel 525 for modulating an analog signal read by the heads 528 into a digital signal and receiving user data to write the data to the disks 521, a position controller 526 for controlling an actuator 523 to move the head 528 into a predetermined position of the disk 521, and a spindle motor controller 527 for controlling a spindle motor 522 to a constant rotation speed. The second HDA 52 may also contain a controller for controlling the reading and writing of data from or to a disk. Thus, each HDA 51 and 52 for controlling the disks and heads thereof, in which circuits for the read/write channel are embedded. Here, the circuits for the read/write channel include the position controller and spindle motor controller.

The main PCB 55 is physically separated from the first and second HDAs 51 and 52, and controls the reading/writing of data by the first and second HDAs 51 and 52. Also, there are connectors (not shown) for electrically connecting the main PCB 55 with respective HDAs 51 and 52.

The main PCB 55 includes a main controller 553 and a switch unit 551. The main controller 553 sets information about the disks and heads implemented in each HDA 51 and 52, and controls selection of the first HDA 51 or second HDA 52 according to a selection command of the host, and selecting one of the heads belonging to the selected HDA. When intending to access a predetermined disk and head, the switch unit 551 selects an HDA according to the control of the main controller 553 and accesses to the disk and head of the selected HDA via the connector.

The main controller 553 may set information about the disk and head, using a predetermined jumper, such as the number of HDAs connected to the main PCB 55, and the number of heads belonging to each HDA. The main controller 553 recognizes the HDAs connected to the main PCB and the heads of each HDA according to the information set by the jumper, and controls selection of the HDA and head according to the selection command of the host. For example, assuming that two HDAs each having four heads are connected to the main PCB, and the host commands access to a fifth head, the main controller 553 selects a first head of the second HDA 52, which is the fifth head, to read/write data using the selected head. When one head of the HDA 51 or 52 is selected by the main PCB 55, reading/writing of data can be separately performed according to the function of the sub-PCB belonging to the corresponding HDA.

As described above, the HDD according to the present invention can perform reading and writing operations by connecting a plurality of HDAs to one main PCB, thereby providing various disk storage capacities.

What is claimed is:

1. A hard disk drive (HDD) for detecting and reading a signal written on a hard disk using a head, comprising:
   a plurality of head disk assemblies (HDAs), each HDA having a plurality of disks for storing magnetized data and a plurality of heads for writing and reading data to and from the disks and each HDA having a sub printed circuit board (PCB) for performing driving operation or read/write operation of the disks and heads included in corresponding HDA;
   a main PCB, said main PCB physically separated from each HDA, said main PCB electrically connected to the sub PCBs of the HDAs, said PCBs adapted for controlling reading/writing of data by the heads of the HDAs; and
   connectors for electrically connecting the main PCB with each sub PCB.

2. The hard disk drive of claim 1, wherein the main printed circuit board comprises:
   a setting unit for setting information about the disks and heads contained in each head disk assembly; and
   a switch unit for selecting a predetermined disk and head of a selected one head disk assembly according to the information set by the setting unit and assessing the selected disk and head via the corresponding connector when intending to access the predetermined disk and head of the selected one of the head disk assemblies.

3. The hard disk drive of claim 2, wherein the setting unit sets information about the number of the head disk assemblies connected to the main printed circuit board, and about the number of disks and heads contained in each head disk assembly.

4. The hard disk drive of claim 1, wherein each head disk assembly comprises:
   a read/write channel for modulating an analog signal read by the head into a digital signal and receiving user data to write the data to the disk;
   a position controller for controlling movement of the head into a predetermined position of the disk; and
   a spindle motor controller for controlling a spindle motor to a constant rotation speed.

5. The hard disk drive of claim 4, wherein each head disk assembly comprises a controller for reading and writing from and to the respective disk.

6. A hard disk drive, comprising:
   a main control board; and
   a plurality of head disk assemblies comprising a plurality of disk memories and a plurality of heads disposed to write data on said memories, each of said head disk assemblies being electrically connected by connectors to said main control board and each containing at least one controller governing, responsively to said main control board, driving operations and read and write operations of said heads.

7. The hard disk drive of claim 6, wherein each said head disk assembly contains a plurality of disks for storing magnetized data and a corresponding plurality of heads for reading and writing data to and from said disks.

8. The hard disk drive of claim 7, wherein said main control board controls reading and writing of data by said heads of said disks.

9. The hard disk drive of claim 8, wherein said main control board comprises a setting unit for setting information about the disks and heads contained in each head disk assembly.

10. The hard disk drive of claim 9, wherein said main control board comprises a switch unit for selecting a predetermined disk and head of a selected one head disk assembly according to the information set by the setting unit and accessing the selected disk and head via the corresponding connector when intending to access the predetermined disk and head of the selected one of the head disk assemblies.

11. The hard disk drive of claim 10, wherein the setting unit sets information about the number of the head disk assemblies connected to the main printed circuit board, and about the number of disks and heads contained in each head disk assembly.

12. The hard disk drive of claim 11, wherein each head disk assembly comprises:
   a read/write channel for modulating an analog signal read by the head into a digital signal and receiving user data to write the data to the disk;
   a position controller for controlling movement of the head into a predetermined position of the disk; and
   a spindle motor controller for controlling a spindle motor to a constant rotation speed.

13. The hard disk drive of claim 12, wherein said main control board controls reading and writing of data by said heads of said disks.

14. A hard disk drive, comprising:
   a main control board; and
   a plurality of head disk assemblies, each electrically connected by connectors to said main control board and each containing at least one controller controlling, responsively to said main control board, movement of corresponding actuators of said head disk assemblies selected by said main control board.

15. A process for manufacturing a hard disk drive adapted for detecting and reading a signal written on a hard disk, said method comprising the steps of:
   (1) providing a plurality of head disk assemblies (HDAs), each HDA having a plurality of disks for storing magnetized data and a plurality of heads for writing and reading data to and from the disks and each HDA having a sub printed circuit board (PCB) for performing driving operation or read/write operation of the disks and heads included in corresponding HDA;
   (2) electrically connecting to the sub PCB a main PCB, said main PCB physically separated from each HDA, said main PCB electrically connected to the sub PCBs of the HDAs, said PCBs adapted for controlling reading/writing of data by the heads of the HDAs; and
   (3) electrically connecting the main PCB with each sub PCB.

16. The process of claim 15, wherein the main PCB comprises:
   a setting unit for setting information about the disks and heads contained in each head disk assembly; and
   a switch unit for selecting a predetermined disk and head of a selected one head disk assembly according to the information set by the setting unit and assessing the selected disk and head via the corresponding connector when intending to access the predetermined disk and head of the selected one of the head disk assemblies.

17. The process of claim 15, wherein each HDA comprises:
   a read/write channel for modulating an analog signal read by the head into a digital signal and receiving user data to write the data to the disk;

a position controller for controlling movement of the head into a predetermined position of the disk; and a spindle motor controller for controlling a spindle motor to a constant rotation speed.

18. A method for providing a plurality of disk storage capacities so that a plurality of head disk assemblies (HDAs) can be driven within a single hard disk drive structure, said method comprising the steps of:

(1) providing a plurality of head disk assemblies (HDAs), each HDA having a plurality of disks for storing magnetized data and a plurality of heads for writing and reading data to and from the disks and each HDA having a sub printed circuit board (PCB) for performing driving operation or read/write operation of the disks and heads included in corresponding HDA;

(2) electrically connecting to the sub PCB a main PCB, said main PCB physically separated from each HDA, said main PCB electrically connected to the sub PCBs of the HDAs, said PCBs adapted for controlling reading/writing of data by the heads of the HDAs; and (3) electrically connecting the main PCB with each sub PCB.

19. The method of claim 18, wherein the main PCB comprises:

a setting unit for setting information about the disks and heads contained in each head disk assembly; and a switch unit for selecting a predetermined disk and head of a selected one head disk assembly according to the information set by the setting unit and assessing the selected disk and head via the corresponding connector when intending to access the predetermined disk and head of the selected one of the head disk assemblies.

20. The method of claim 18, wherein each HDA comprises:

a read/write channel for modulating an analog signal read by the head into a digital signal and receiving user data to write the data to the disk;

a position controller for controlling movement of the head into a predetermined position of the disk; and a spindle motor controller for controlling a spindle motor to a constant rotation speed.

21. A hard disk drive, comprising:

a main control board; and a plurality of head disk assemblies, each electrically connected by connectors to said main control board and each containing at least one controller writing, responsively to said main control board, data to selected memories of said head disk assemblies.

22. A hard disk drive, comprising:

a plurality of head disk assemblies, each having at least one disk memory and a head writing data to and reading data from said disk, and each containing at least one controller performing write operations on a corresponding disk memory; and a main printed circuit board physically discrete from each of said head disk assemblies, operationally connected to control said write operations by corresponding heads of said hard disk assemblies.

23. A hard disk drive, comprising:

a plurality of head disk assemblies, each having at least one disk memory and a head writing data to and reading data from said disk, and each containing at least one controller performing drive operations to move a corresponding head; and a main printed circuit board physically discrete from each of said head disk assemblies, operationally connected to control said drive operations on corresponding heads of said hard disk assemblies.

24. A method of controlling a hard disk drive, comprising the steps of:

driving a main control board to regulate storage of data;

responding to said main control board by controlling writing of data within a selected disk memory within a corresponding one of a plurality of hard disk assemblies, independently of said main control board.

25. A hard disk drive, comprising:

a main control board storing information about a plurality of memory disks and corresponding heads and accessing selected ones of said memory disks and corresponding heads for storage of data; and a plurality of head disk assemblies each containing a corresponding one of said memory disks and corresponding heads, each head disk assembly of said plurality of head disk assemblies operationally connected to said main control board and each said head disk assembly containing at least one controller operationally responsive to said main control board when writing data to one of said memory disks accessed by said main control board.

26. A method of operating a hard disk drive, comprising:

storing on a main control board, information about a plurality of head disk assemblies each containing at least one controller operationally responsive to said main control board and each containing a memory disk and corresponding head;

accessing a selected said memory disk and corresponding head via said main control board; and driving a corresponding controller to respond to said main control board to write data to a selected memory disk within one of said hard disk assemblies accessed by said main control board.

27. A method for constructing a hard disk drive, comprising:

storing within a main control board information about a plurality of memory disks and corresponding heads accessible by said main control board for storage of data;

assembling a plurality of head disk assemblies each containing a corresponding one of said memory disks and corresponding heads; and installing a controller within each of said head disk assemblies; and operationally connecting each said controller to enable each said controller to operationally respond to said main control board by writing data within a corresponding one of said memory disks accessed by said main control board.

28. A hard disk drive, comprising:

a main control board; and a plurality of head disk assemblies, each electrically connected by connectors to said main control board and each containing at least one controller writing, responsively to said main control board, data to memories of said head disk assemblies selected by said main control board.

29. The hard disk of claim 28, comprising:

each head disk assembly comprised of at least one disk and at least one corresponding head; and information about each said disk and each said head stored in said main control board.

30. A method for constructing a hard disk drive, comprising:

storing within a main control board information about a plurality of memory disks and corresponding heads accessible by said main control board for storage of data;

assembling a plurality of head disk assemblies each containing a corresponding one of said memory disks and corresponding heads; and installing a controller within each of said head disk assemblies; and operationally connecting each said controller to enable each said controller to operationally respond to said main control board by controlling movement of a corresponding one of said heads accessed by said main control board.

31. The hard disk of claim 30, comprising:

each head disk assembly comprised of at least one disk and at least one corresponding head; and information about each said disk and each said head stored in said main control board.

* * * * *